(12) United States Patent
Tan et al.

(10) Patent No.: US 11,691,076 B2
(45) Date of Patent: Jul. 4, 2023

(54) COMMUNICATION WITH IN-GAME CHARACTERS

(71) Applicants: Jocelyn Tan, San Jose, CA (US); Sean Rossi, Pinole, CA (US)

(72) Inventors: Jocelyn Tan, San Jose, CA (US); Sean Rossi, Pinole, CA (US)

(*) Notice: Subject to any disclaimer, the term of this patent is extended or adjusted under 35 U.S.C. 154(b) by 309 days.

(21) Appl. No.: 16/989,171

(22) Filed: Aug. 10, 2020

(65) Prior Publication Data
US 2022/0040581 A1 Feb. 10, 2022

(51) Int. Cl.
| | |
|---|---|
| *A63F 13/424* | (2014.01) |
| *G06T 19/00* | (2011.01) |
| *G10L 15/22* | (2006.01) |
| *G10L 15/04* | (2013.01) |
| *G06F 3/01* | (2006.01) |
| *G10L 13/047* | (2013.01) |
| *G10L 15/16* | (2006.01) |
| *G10L 15/02* | (2006.01) |
| *G10L 25/24* | (2013.01) |

(Continued)

(52) U.S. Cl.
CPC ............ *A63F 13/424* (2014.09); *G06F 3/011* (2013.01); *G06T 19/006* (2013.01); *G10L 13/047* (2013.01); *G10L 15/02* (2013.01); *G10L 15/04* (2013.01); *G10L 15/16* (2013.01); *G10L 15/22* (2013.01); *G10L 25/24* (2013.01); *G10L 25/30* (2013.01); *A63F 13/533* (2014.09); *G10L 15/142* (2013.01)

(58) Field of Classification Search
CPC ......... G10L 25/24; G10L 25/30; G10L 15/16; G10L 15/142; G10L 15/02; G10L 13/047; A63F 13/424; A63F 13/533; G06F 3/011; G06T 19/006
See application file for complete search history.

(56) References Cited

U.S. PATENT DOCUMENTS

| | | |
|---|---|---|
| 4,581,756 A | 4/1986 | Togawa et al. |
| 4,696,042 A | 9/1987 | Goudie |
| 4,776,016 A | 10/1988 | Hansen |
| 4,908,864 A | 3/1990 | Togawa |

(Continued)

OTHER PUBLICATIONS

Marsella, Stacy, et al. "Virtual Character Performance From Speech." Online Publication Date: Jul. 19, 2013. SCA '13: Proceedings of the 12th ACM SIGGRAPH/Eurographics Symposium on Computer Animation. pp. 25-35. <https://doi.org/10.1145/2485895.2485900> (Year: 2013).*

*Primary Examiner* — William H McCulloch, Jr.
(74) *Attorney, Agent, or Firm* — Cynthia S. Lamon; Lamon Patent Services (57) ABSTRACT

A system for coordinating reactions of a virtual character with script spoken by a player in a video game or presentation, comprising an internet-connected server executing software and streaming video games or presentations to a player's computerized device. The system senses start of a dialogue between the player and the virtual character, displays a script for the player on a display of the computerized platform, prompts the player to speak the script. A timer then starts, or the system tracks an audio stream of the spoken script, determines where the player is in the script by the timer or the audio stream, and causes specific actions and responses of the virtual character according to pre-programmed association of actions and responses of the character to points of time or specific variations in the audio stream.

12 Claims, 5 Drawing Sheets

(51) Int. Cl.
  *G10L 25/30* (2013.01)
  *A63F 13/533* (2014.01)
  *G10L 15/14* (2006.01)

(56) References Cited

U.S. PATENT DOCUMENTS

| | | | |
|---|---|---|---|
| 5,129,000 A | 7/1992 | Tanaka | |
| 5,170,432 A | 12/1992 | Hackbarth et al. | |
| 5,955,693 A | 9/1999 | Kageyama | |
| 6,708,150 B1 | 3/2004 | Hirayama et al. | |
| 6,990,445 B2 | 1/2006 | Ky | |
| 7,027,565 B2 | 4/2006 | Tateishi et al. | |
| 7,164,076 B2* | 1/2007 | McHale | G10H 1/368 84/645 |
| 7,203,651 B2 | 4/2007 | Baruch et al. | |
| 7,548,861 B2 | 6/2009 | Nada | |
| 7,725,307 B2* | 5/2010 | Bennett | G06F 16/24522 704/238 |
| 8,469,713 B2* | 6/2013 | Kron | G09B 5/065 434/156 |
| 8,604,327 B2* | 12/2013 | Takeda | G10H 1/0008 704/260 |
| 9,076,448 B2* | 7/2015 | Bennett | G10L 15/30 |
| 9,437,191 B1 | 9/2016 | Chen | |
| 9,437,206 B2 | 9/2016 | Yu et al. | |
| 9,721,373 B2* | 8/2017 | Marsella | G06T 13/00 |
| 9,754,586 B2 | 9/2017 | Deligne et al. | |
| 11,244,668 B2* | 2/2022 | Yu | G10L 25/24 |
| 11,282,257 B2* | 3/2022 | Li | G06T 7/74 |
| 2003/0130843 A1 | 7/2003 | Ky | |
| 2007/0005370 A1 | 1/2007 | Elshout | |
| 2008/0020361 A1* | 1/2008 | Kron | G09B 23/28 434/262 |
| 2009/0138335 A1* | 5/2009 | Lieberman | G06Q 30/0204 705/7.33 |
| 2010/0028846 A1* | 2/2010 | Cohen | G09B 19/06 434/323 |
| 2010/0312547 A1 | 12/2010 | van Os et al. | |
| 2011/0144987 A1 | 6/2011 | Zhao et al. | |
| 2012/0078634 A1 | 3/2012 | Ariu | |
| 2012/0101871 A1* | 4/2012 | Lieberman | G06Q 30/0269 705/7.29 |
| 2013/0041670 A1 | 2/2013 | Morgan et al. | |
| 2013/0051548 A1* | 2/2013 | Chavez | G06Q 10/101 379/265.09 |
| 2013/0110565 A1* | 5/2013 | Means, Jr. | G06Q 10/063 705/7.11 |
| 2013/0231937 A1 | 9/2013 | Woodall et al. | |
| 2017/0169818 A1 | 6/2017 | VanBlon et al. | |
| 2019/0388787 A1* | 12/2019 | Padmanabhan | G09B 19/00 |
| 2020/0251089 A1 | 8/2020 | Pinto | A63F 13/54 |
| 2020/0297262 A1 | 9/2020 | Chappell, III | H04N 21/42201 |
| 2021/0149941 A1 | 5/2021 | Moskowitz | G06Q 50/01 |
| 2021/0312400 A1* | 10/2021 | Irimie | G06Q 10/0635 |
| 2021/0352380 A1* | 11/2021 | Duncan | H04N 21/4852 |
| 2021/0375260 A1* | 12/2021 | Yu | G10L 15/142 |
| 2022/0040581 A1* | 2/2022 | Tan | G10L 15/04 |

* cited by examiner

COMMUNICATION WITH IN-GAME CHARACTERS

BACKGROUND OF THE INVENTION

1. Field of the Invention

The present invention is in the technical area of virtual reality systems, and pertains more particularly to communication by players with in-game characters.

2. Description of Related Art

Virtual reality systems and video games based on such systems are well known in the art. In the latest technology, on-line enterprises stream video games to players, also termed users in this specification, from game servers and streams to users are updated based on actions by the users, such as moving an avatar in a game.

In some games and in some other VR circumstances, it may be desired that a user speak directly to a VR character, and for the character to respond to the user's input in some manner, such as by a returned communication, by an action, or by a series of actions. As a very simple example, a character may be programmed to turn a somersault in the video triggered by a voice input by a user. The voice input may be in a situation where there is one user and one character, for example a user might say "turn a somersault". It is, of course, necessary that the system at the game server understand the voice input and meaning from the user.

In conventional technology the interaction between a user and the system in such a circumstance requires substantial computer resources. Typically, there must be a voice-recognition system to resolve the audio input to a word or a phrase, and a library of words and phrases used for matching and triggering the programmed reaction of the character. In many circumstances the situation may be a multi-player game, and there may also be multiple characters in the game; if this is the case, then the challenge at the server is even greater because the server has to know the user and because there must be recognizable input from the user to identify the character being addressed so that the right character may be triggered to perform the response or responses.

What is clearly needed is an improvement wherein input from the user may be understood and managed by the system without need for voice recognition or libraries of words and phrases.

BRIEF SUMMARY OF THE INVENTION

The present invention provides a method for coordinating physical and verbal reactions of a virtual character with script spoken by a player in a video game or presentations, for example virtual reality (VR) simulations. The system starts the process by sensing a start of a dialogue and displaying a script for a player on a display of a computerized platform used by the player, and prompting the player to speak the script. A timer is then started and/or tracking begins on an audio stream of the spoken script. A determination is then made as to where the player is in the script by the timer or the audio stream, which causes specific actions and responses of the virtual character according to pre-programmed association of actions and responses of the character to points of time or specific variations in the audio stream.

In one embodiment, in the step for sensing start of a dialogue, the system associates viewpoint of the player with a specific virtual character in the video game or presentation and selects a script accordingly. One embodiment includes that specific actions and responses of the virtual character are implemented according to passage of time since the start of the dialogue. Additionally, specific actions and responses of the virtual character are implemented according to specific variations in the audio stream.

Another embodiment provides a step of sensing that the dialogue is finished, wherein a step of playing any one of a verbal reaction and at least facial physical movement by the virtual character after the end of dialogue is sensed.

A system may also be provided for coordinating reactions of a virtual character with script spoken by a player in a video game or presentation, comprising an internet-connected server executing software and streaming video games or presentations including VR simulations. An internet-connected computerized platform used by a player is also provided in this embodiment, the platform having a display, a command input interface, and a microphone.

In this embodiment, the system senses start of a dialogue between the player and the virtual character, displays a script for the player on a display of the computerized platform and prompts the player to speak the script. The system then starts a timer and/or tracks an audio stream of the spoken script, determines where the player is in the script by the timer or the audio stream, and causes specific actions and responses of the virtual character according to pre-programmed association of actions and responses of the character to points of time or specific variations in the audio stream.

One embodiment provides that the system associates viewpoint of the player with a specific virtual character in the video game or presentation and selects a script accordingly. One embodiment provides that specific actions and responses of the virtual character are implemented according to passage of time since the start of the dialogue. Alternatively, or in addition to this embodiment, specific actions and responses of the virtual character are implemented according to specific variations in the audio stream.

The system may also further determine when the dialogue is finished further comprising a step of sensing that the dialogue is finished. In this embodiment, after determining that the dialogue is finished, the system plays a verbal reaction by the virtual character after the end of dialogue is sensed.

DETAILED DESCRIPTION OF THE INVENTION

Figure 1:
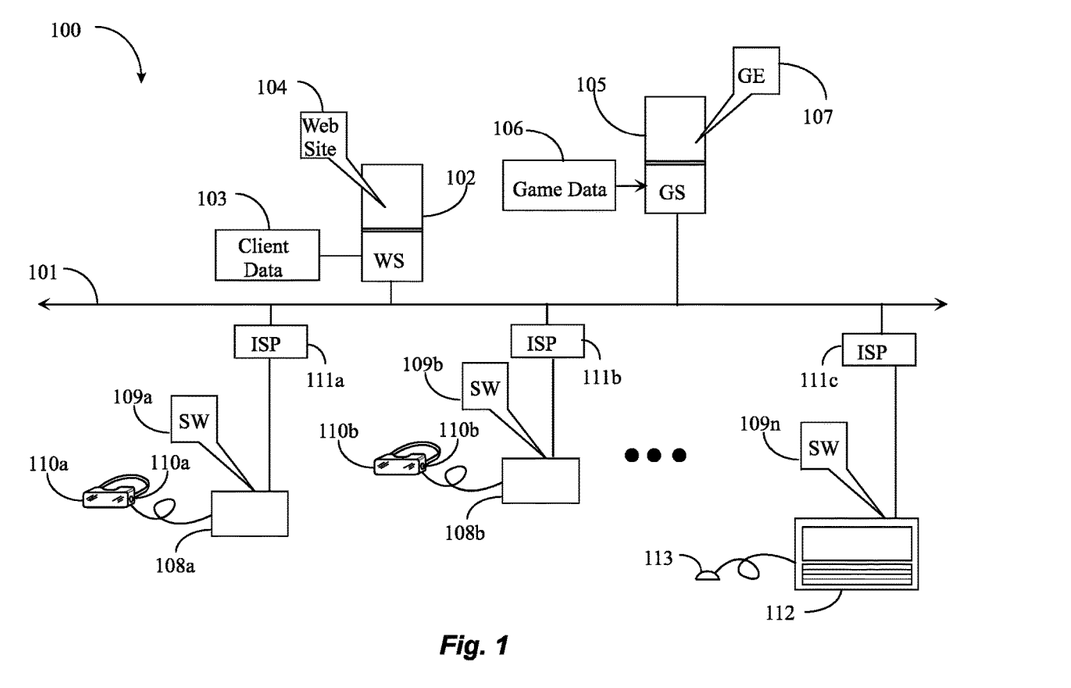
FIG. 1 is an architectural diagram in an embodiment of the invention.

FIG. 1 is an architectural diagram 100 in an embodiment of the invention. Line 101 in the figure represents the well-known Internet network and all subnetworks and components of the Internet. An Internet-connected server 102 coupled to a data repository 103 executing software 104 provides a web site in this example for a video gaming enterprise. Data repository 103 stores client data among other data; in one example repository 103 profiles for registered members of the enterprise who are regular players of video games streamed by the enterprise from game servers, such as, server 105 connected to the Internet, executing software 107 including a game engine, and storing and processing games and game data in a coupled data repository 106.

In this example the gaming enterprise hosting server 102 and 105 stream games to players using game platforms such as computerized appliance 108*a* executing software 109*a*, communicating with the enterprise servers through an Internet service provider (ISP) 111*a*. Platform 108*a* has a connected head-mounted display 110*a* with input interface 111*a* through which a player inputs commands during game play. This head-mounted display may also comprise a gyroscope or other apparatus for determining the head position of the player wearing the display. This is input the system may be used to decide where the user may be looking. The skilled person will understand that ISP 111*a* is a generalized representation meaning to encompass all of the many ways that a gaming platform may connect to the Internet network.

A second player platform 108*b* executing software 109*b* communicates through an ISP 111*b* and provides a head-mounted display 110*b* with input interface 111*b* for a second player. And a third platform 113 with a display and a keyboard 112 has a pointer (not shown) executes software 109*n* and communicates through an ISP 111*c*.

The representations of the gaming platforms are meant to illustrate a substantial number of such platforms that may be communicating with the gaming enterprise servers in parallel with a number of players, some of whom may be engaged in multi-player games streamed by the enterprise servers. The skilled person will also understand that, in some circumstances, games may be stored locally and played with local software from data repositories at the individual gaming platforms.

The skilled person will also understand the general process in the playing of video games and in other instances of individual users at local platforms interacting with virtual reality presentations. The general circumstance is that a user (player) at a gaming platform has a display, which may be a head-mounted display as illustrated in FIG. 1, and has an input interface through which the player may input commands. A virtual reality presentation is presented on the display which may provide animated virtual characters typically termed avatars in the art. The player interacts with the game and may be associated with a specific avatar such that the player may input commands to move the avatar, and then the game engine receives the commands and manipulates the game data to move the avatar and stream new data to the player and/or other players in a multiplayer game so that the avatar is seen to move in the display.

In some circumstances it may be desirable to provide programming wherein a player may engage in direct voice communication with an avatar, and that avatar may respond to the voice input of the player, by a specific movement, a change of facial expression, and even a voice response. For this purpose, it is, of course, necessary that the game platform in use by the player may have a microphone such that the player's voice input may be communicated to the game engine which may then make the data edits to stream new data to the player and other players in order to display the responses of the avatar to whom voice input is directed. It is typical that platforms as shown in FIG. 1 will have microphones.

In a circumstance of voice input by a player directed to a specific avatar, it is needed that the system recognize the player speaking and the avatar spoken to. The programming of the game or other video presentation has preprogrammed input for the player, and the player's voice input is anticipated. The responses of the avatar are also pre-programmed. The system will update the data stream for the avatar to perform whatever pre-programmed responses are associated with certain voice input.

In an embodiment of the invention with a game or video presentation in progress in which player voice input and virtual character response is programmed and enabled, it is necessary for the system to respond to a trigger event to begin listening for a player voice input. In one embodiment, the system may simply switch to "listening" mode at specific time intervals. Other triggers may comprise tracking which point on the screen a player may be looking or which point the player has concentrated activity. In another example, certain start words may trigger listening mode; for example, the player may say "Hey!" and the system in response will start a voice input-character response process.

In one embodiment, the system, when triggered, continues listening to the player until the player has stopped speaking, or until a predetermined time interval has been reached. In the case of a predetermined time interval, after the time expires the microphone starts listening for the specific start words again. Upon recognizing a trigger event, the system listens for the predetermined duration or until the user has stopped speaking. While the user is speaking, in-game responses are triggered based on the time interval of the speech.

A typical use case involves the system recognizing a trigger event. The system may display a script for the player to address to the virtual character identified as the target of the voice input. As the player begins to read the script from script displayed, rather than resorting through a voice recognition and a library of word and phases matched with character activity, the system simply tracks the players real-time position in the script and triggers the virtual character's responses accordingly. As a simple example, if the script describes details of a recent sporting event to an in-game character, the character may be caused to visibly shake the head when the user mentions a blown play or may widen the eyes with shock when the player explains how their team took the lead in the end. After the player reaches the end of the script and is finished speaking, there may be an interval where the character may speak a predetermined set of lines based on what the user said from the script, and then the system goes back to listening mode, looking for another trigger.

Figure 2:
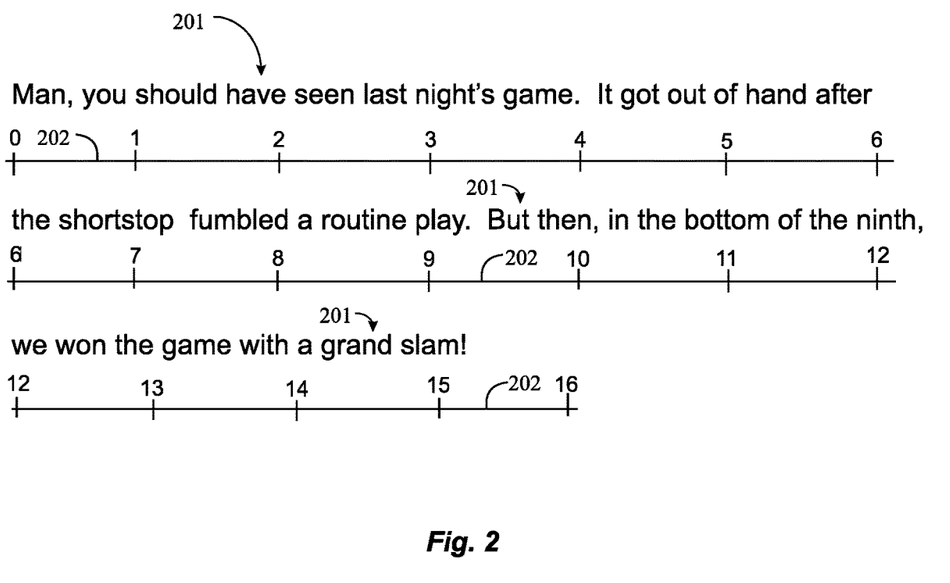
FIG. 2 is a diagram of a timeline associated with a spoken script in an embodiment of the invention.

FIG. 2 is a diagram of an example script 201 and a corresponding timeline 202 illustrating time passed from 0 to 16 seconds as a player speaks script 201. In this simple example, a player speaking at an "average" or 'typical' rate will take a bit over 15 seconds to speak the entire script. The first sentence completes at 4 seconds, the second sentence at about 9.5 seconds, and the third at just over 15 seconds.

Figure 3:
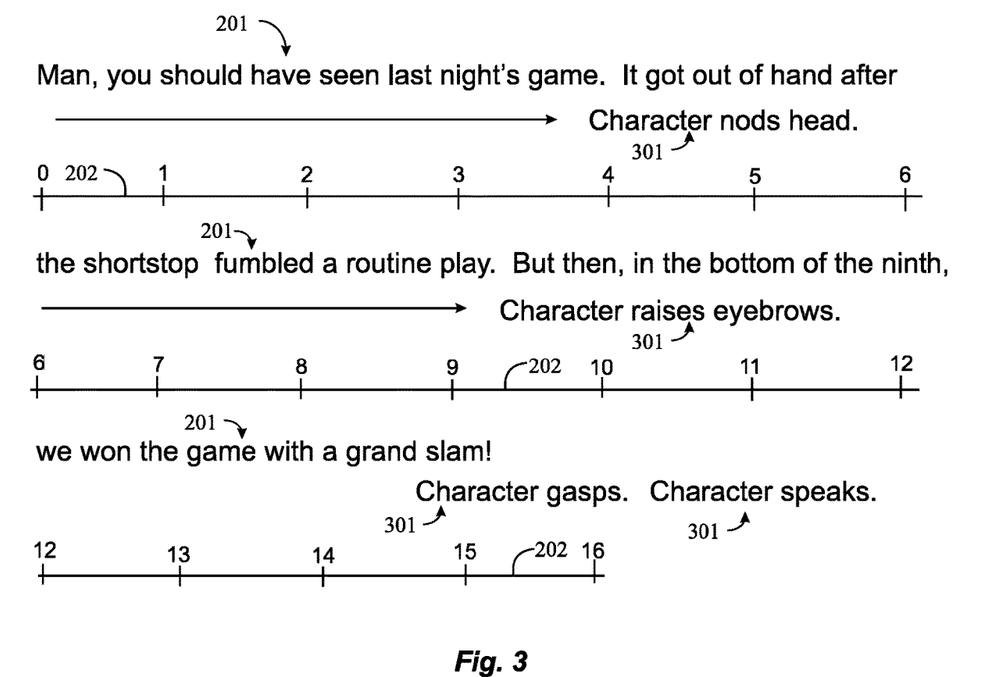
FIG. 3 is a diagram like that of FIG. 2, with character actions and responses associated with the timeline along with the spoken script.

In one embodiment, the system assumes the player talking speaks at the rate illustrated in FIG. 2 and controls the response of the virtual character accordingly. For example, the system may control the character to behave, as shown in FIG. 3, along the same example script 201. In FIG. 3, character responses and actions 301 are illustrated in words. At 4 seconds, after the player begins speaking, the system causes the character to nod the head, acknowledging that he or she said "you should have seen last night's game." At about 9 seconds, the system causes the character to raise the eyebrows in response to the speaking of "the shortstop fumbled a routine play," At about 15 seconds, the system causes the character to gasp and speak, in response to hearing "we won the game with a grand slam!"

Again, this example assumes the player speaks at a particular pre-assumed rate. This creates a problem because, in some circumstances, players may speak faster or slower than this assumed rate, the coordination may be awkward.

Referring back to FIG. 1, note that client data is stored in data repository 103. The clients are the players/users referred to in these examples. The system may track client voice input and store a data points to indicate the speaking rate of each player and use this data to coordinate the character responses to specific players so that an "average" speaking rate is might no longer be assumed and coordination may be better controlled.

Figure 4:
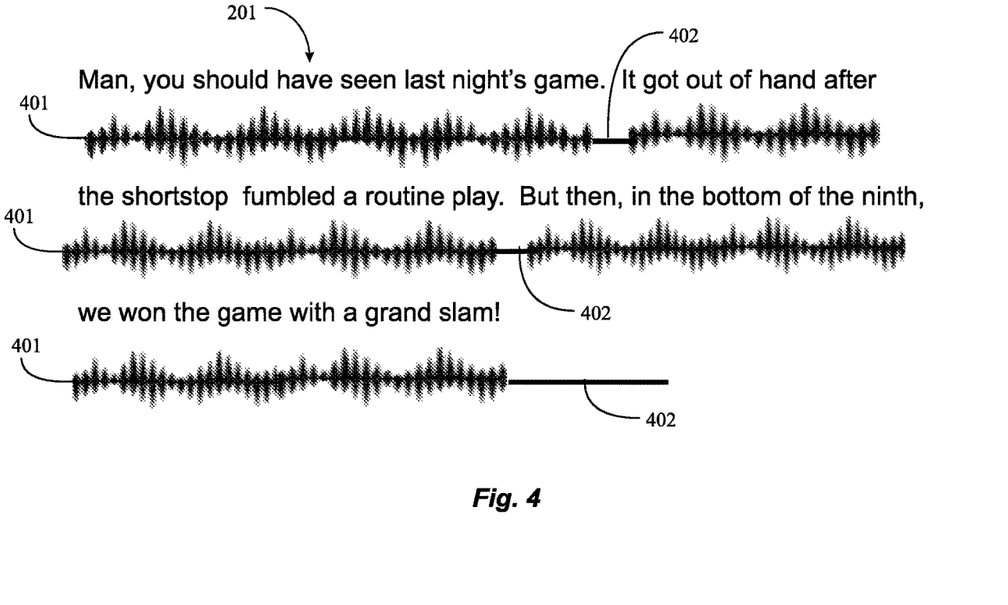
FIG. 4 is a diagram of the spoken script of FIG. 2 and FIG. 3 associated with an audio track of the script.

FIG. 4 is an example an audio track 401 on example script 201 of a player speaking the script of FIGS. 2 and 3. The variations in the audio track 401 may be monitored to determine number of syllables and words. In this particular example, the spaces 402 on the audio track 401 indicate the end of one sentence of example script 201 and the beginning of another. With proper coding, the system, knowing the script, can tell where the player speaking is in the script by the variations and quiet spaces in the audio track. The system may then control the virtual character's responses accordingly. This process is precise and does not rely on timing of a speaker.

Figure 5:
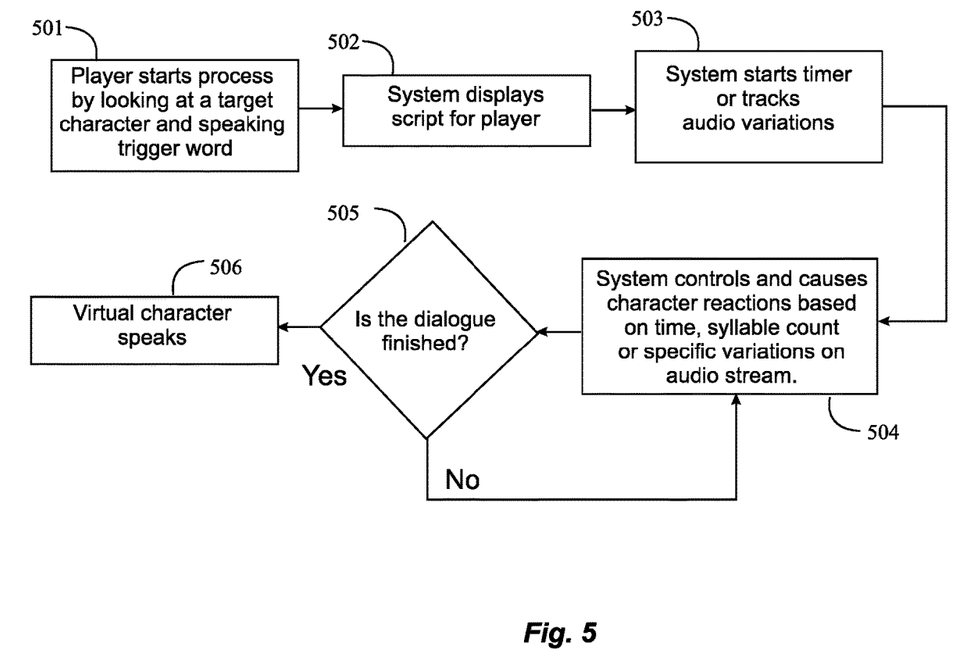
FIG. 5 is a flow diagram of a method in an embodiment of the invention.

FIG. 5 is a flow diagram depicting steps of a method for coordinating character responses and actions derived from spoken words and phrases by a player in an embodiment of the invention. At step 501 a player starts the process by looking at a target character and speaking a trigger word. The system displays a script for the player at step 502. The system starts a timer or tracks variations in an audio wave for the player at step 503. At step 504 the system controls and causes character reactions, such as facial expressions or gasps, based on time, syllable count, or specific variations in the audio stream. At step 505 the system determines if the dialogue is finished. This may be based on a pre-programmed silent period length. If the dialogue is over, the virtual character may make a final utterance and/or movements at step 506. If the dialogue is not over, the system continues control and cause character reactions based on time, syllable count, or specific variations in audio waves.

The skilled person will understand that the embodiments described above are exemplary and not specifically limiting to the scope of the invention. Many functions may be accomplished in different ways, and apparatus may vary in different embodiments. The invention is limited only by the scope of the claims.

The invention claimed is:

1. A method for coordinating reactions of a virtual character with a script spoken by a player in any one of a video game and virtual reality (VR) presentation, comprising:
providing a player script on a computerized platform used by the player;
providing a corresponding timeline for speaking the player script,
associating specific virtual character actions and responses with specific points in the timeline and programming the specific actions and responses of the virtual character to occur at the associated specific points in the timeline;
displaying the player script on a display of the computerized platform and prompting the player to speak the player script;
sensing start of a live audio stream from the player of the player script and tracking progress through the timeline by at least one of starting a timer and monitoring the live audio stream of the spoken script;
causing the specific actions and responses of the virtual character according to their programmed association with the specific points in the timeline.

2. The method of claim 1 wherein, in the step for sensing start of the live stream, the system associates viewpoint of the player with a specific virtual character in the video game or VR presentation and selects a script accordingly.

3. The method of claim 1 wherein specific actions and responses of the virtual character are implemented according to passage of time since the start of the live stream.

4. The method of claim 1 wherein specific actions and responses of the virtual character are implemented according to specific variations in the audio stream.

5. The method of claim 1 further comprising a step of sensing that the live stream is finished.

6. The method of claim 5 further comprising a step of playing any one of a verbal reaction and at least facial physical movement by the virtual character after the end of the live stream is sensed.

7. A system coordinating reactions of a virtual character with script spoken by a player in any one of a video game or VR presentation, comprising:
an internet-connected server executing software and streaming video games or presentations;
an internet-connected computerized platform used by a player, the platform having a display, a command input interface, and a microphone;
a player script and specific virtual character actions and responses on the computerized platform used by the player;
a corresponding timeline for speaking the player script,
wherein the specific virtual character actions and responses are associated with specific points in the timeline, the specific actions and responses of the virtual character are programmed to occur at the associated specific points in the timeline, the player script is displayed on the display of the computerized platform, the player is prompted to speak the player script, start and progress of a live audio stream of the player script is tracked through the timeline by at least one of starting a timer and monitoring the live audio stream of the spoken script, and the specific actions and responses of the virtual character are caused according to their programmed association with the specific points in the timeline.

8. The system of claim 7 wherein the system associates viewpoint of the player with a specific virtual character in the video game or presentation and selects the player script accordingly.

9. The system of claim 7 wherein specific actions and responses of the virtual character are implemented according to passage of time since the start of the live audio stream.

10. The system of claim 7 wherein specific actions and responses of the virtual character are implemented according to specific variations in the audio stream.

11. The system of claim 7 wherein the system further determines when the live audio stream is finished further comprising a step of sensing that the dialogue is finished.

12. The system of claim 11 wherein the system, after determining that the live audio stream is finished plays a verbal reaction by the virtual character after the end of live audio stream is sensed.

\* \* \* \* \*